United States Patent Office 3,708,517
Patented Jan. 2, 1973

---

3,708,517
4,4'-DIISOCYANO-THIO-DIPHENYLETHER
Ivar Karl Ugi, 1846 Preuss Road,
Los Angeles, Calif. 90035
No Drawing. Application Mar. 11, 1970, Ser. No. 17,999, which is a continuation of application Ser. No. 588,656, Sept. 26, 1966, which in turn is a continuation of application Ser. No. 264,707, Mar. 12, 1963. Divided and this application Jan. 27, 1971, Ser. No. 110,307
Int. Cl. C07c 119/02
U.S. Cl. 260—465 H       1 Claim

ABSTRACT OF THE DISCLOSURE 4,4'-diisocyano-thio-diphenylether having the formula

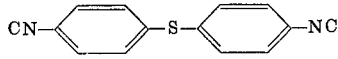

This new compound is useful as an intermediate for the manufacture of plant protection agents.

---

This application is a division of Ser. No. 17,999 filed Mar. 11, 1970, which is in turn a continuation of Ser. No. 588,656, filed on Sept. 26, 1966, now abandoned which is in turn a continuation of Ser. No. 264,707, filed on Mar. 12, 1963 also now abandoned.

This invention relates to new polyisonitriles having at least two isonitrile groups and to a new process for their production. The new polyisonitriles may be represented by the general formula C≦N—R—N≧C, wherein R is selected from the group consisting of an alkylidene, having 4 to 12 carbon atoms, an arylidene, an alkylarylidene, an alkylidene carbonate, a monoisocyano arylidene, a monoisocyano alkylarylidene, a diisocyano arylidene, a diisocyano alkylarylidene and a heterocyclic group.

It is already known to produce monoisonitriles by splitting off water from monoformylamides. This water is split off with agents known for this purpose in the homogeneous phase and in this way sometimes quite good yields of monoisonitriles are obtained.

It is difficult to apply this reaction to polyformylamines, because these compounds are only very slightly soluble in the solvents to be considered for the reaction.

However, it is known that the diisonitrile can be obtained from one special diformylamine by working in a large quantity of solvent, such as pyridine in order to maintain a homogeneous phase (see in this respect "Pharmazie" 1957, 12, 567–571).

This process is however not applicable on the large industrial scale for various reasons. On account of the poor solubility of the staring product, it is necessary to use a very large quantity of solvent. Despite the fact that the reaction is in homogeneous phase, only a very poor yield of diisonitrile is obtained. This is to be attributed to the fact that splitting of water from the formylamino group only takes place slowly on account of the high dilution, while the resinification reaction, which is produced by the agents splitting off water, proceeds quickly, even in dilute solution.

The new polyisonitriles can be prepared in a simple manner by splitting off water from polyformylamines with the aid of agents splitting off water and in the presence of bases and solvents if the suspension of the finely divided polyformylamine is reacted while stirring strongly with the agents splitting off water. In this case, therefore, the operation takes place in heterogeneous phase.

The course of the reaction according to the invention can in principle be reproduced by the following reaction scheme:

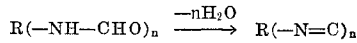

In this formula, R represents an alkyl, aryl, aralkyl or heterocyclic group, $n$ is an integer of at least 2, indicating how many formylamino groups are contained in the molecule.

It is to be considered as extremely surprising that it is possible by the process according to the invention to produce polyisonitriles with good yields, although the reaction is conducted in heterogeneous phase. In view of the state of the art, it was to be assumed that the reaction would only proceed extremely slowly and as a result considerable resinification of the forming isonitriles would occur. Furthermore, when carrying out the reaction in heterogeneous phase, an excess of agents splitting off water in the liquid phase is unavoidable. However, this excess should cause considerable resinification of the isonitriles which are formed. It is a surprising fact that when carrying out the reaction in the heterogeneous phase resinification is completely checked in relation to the splitting off of water and undoubted formation of the isonitrile group.

As starting materials for the process of the invention there are to be considered all compounds which contain the formylamino grouping at least twice in the molecule. The formation of the molecule itself is of no importance for the progress of the reaction, as long as it involves hydrocarbon. These polyvalent hydrocarbon radicals can however also be further substituted by substituents which do not react under the reaction conditions. Such substituents include essentially halogens, such as fluorine, chlorine, bromine and iodine, cyanogen, sulphone, ether and disubstituted amino groups. The basic structure of the polyformylamines can however also contain heterocyclic compounds or consist of the latter.

The starting materials according to the invention are for the most part unknown. However, they can be produced in simple manner by heating the corresponding amines with formic acid, if desired in the presence of a solvent, such as dimethyl formamide, to temperatures between 80 and 150°. Solutions of highest possible concentration are preferably used for this purpose. On cooling, the required formylamino compounds crystallise out. In particular cases, this does not occur and then the excess solvent is distilled off in vacuo and the required formylamine is obtained as residue. Examples relating to the production of these starting materials are given in the examples of the reaction according to the invention.

Sterically hindered formylamines are particularly suitable for the reaction according to the invention. By "sterically hindered" formylamines, there are understood for example those aromatic formylamines which comprises substituents in one and advantageously in both o-positions. The bulk of the substituents is generally of no significance. The following are to be mentioned as examples of effective substituents: halogens, alkyl, aryl, alkoxy, aroxy and cycloalkyl groups as well as cyanogen and ester radicals. Steric hindrance of aromatic formylamines also occurs when they are disposed in juxtaposition to the orthofusion position in a polynuclear, aromatic system and possibly also contain another radical in the other o-position. Particularly valuable starting materials are represented by the sterically hindered amino derivatives of diphenyl and triphenyl alkanes.

The following compounds are to be specifically mentioned as polyformylamino compounds: hexamethylene diformamide, 2-methyl-2,4-diformylamino pentane, di-(2-methyl-2-formylamino-1-propyl) carbonate, p-di-(2-formylamino-2-propyl) benzene, 1-methyl-3,5-diethyl-2,4-phenylene diformamide, 1,3,5-triisopropyl-2,4-phenylene diformamide, 4,α-diformylethylbenzene, 1,5- and 2,7-naphthylene diformamides, N,N'-diformyl benzidine and tolidine, 4,4'-diformylamino diphenyl methane, 3,3'-dimethyl-5,5'-dichloro-4,4'-diformylamino-diphenylmethane, 3,3'-dimethyl-5,5'-diethyl-4,4'-diformylamino diphenyl methane, 3,3',5,5'-tetraethyl- and 3,3',5,5'-tetraisopropyl-4,4'-diformaylamino diphenyl methane, 3,3'-dimethyl-4,4',4''-triformylamino triphenyl methane, 4,4',4''-triformylamino triphenyl phosphate and thiophosphate.

Acyl halides in the presence of bases may be used as agents splitting off water. The following halides may be mentioned: phosgene, cyanogen chloride, cyanuric chloride, cyanogen bromide, phosphorus trichloride, phosphorus bromide, phosphorus oxychloride, thionyl chloride, benzene sulphochloride, and toluene sulphochloride. The following compounds have proved especially suitable as bases: sodium tert.-butylate and potassium tert.-butylate, as well as trialkylamines, such as trimethylamine and triethylamine, but also diazabicyclooctane and heterocyclic tertiary bases, such as pyridine, and also potassium carbonate.

Combinations of phosgene with trimethylamine or triethylamine and also the combination of phosphorus oxychloride with pyridine are particularly suitable agents for splitting off water.

The temperature at which the reaction is carried out may be in the range of $-40°$ to $+120°$ C. It is advisable not to use temperatures of higher than 60° C. The preferred temperature range runs from about $-20$ to $+50°$ C.

Preferably 0.5 to 2 mols and advantageously 0.9 to 1.3 mols of the acyl halide and 1.0 to 20 mols, preferably 1.8 to 4 mols, of the base are used for each mol of formylamino group in carrying out the reaction. About 0.3 to 5 litres and advantageously 0.4 to 2 litres of the solvent are used per mol of formylamino group for the production of the suspension. These quantities of solvent are by far below that necessary to dissolve the formylamino compounds. Generally, a solution is only formed with quantities of more than 20 litres of solvent per mole of formylamino compound.

Suitable as solvents are inert organic solvents, such as hydrocarbons, halogenated hydrocarbons, ethers, esters and tertiary amines. The following solvents are to be specifically mentioned: light petroleum fractions, benzene methylene chloride, chloroform, diethyl ether, tetrahydrofuran, ethyl acetate, triethylamine and pyridine.

It is advisable to add the acyl halide to the thoroughly stirred suspension of the formylamine and the base with the solvent or to introduce it in gaseous form. In principle, it is however possible for the reactants to be combined in any desired sequence; it is merely necessary to avoid the isonitrile which forms from coming into contact with strong acid.

In the reaction, it is very important for the solid phase to be thoroughly mixed in finest possible divided form with the liquid phase. High-power stirrer devices are especially suitable for this purpose, but also shaker-type vessels and vibromixers. The so-called liquid mills are particularly advantageous in that a number of relatively large solid particles are simultaneously broken down with thorough stirring.

The working up is generally effected by adding water, separating the organic phase, distilling off the solvent and purifying the isonitrile which is left by distillation or recrystallisation. However, purification is frequently unnecessary, because the product is obtained with a sufficiently high degree of purity.

The process can also be carried out continuously, in which case trimethylamine is preferred as base, on account of its easy recoverability.

The products obtainable according to the invention are new and can serve as intermediate products for the manufacture of plant-protection agents and age resisters and against intestinal parasites of animals. They can in addition also be used directly for cross-linking or hardening synthetic plastics which contain carboxyl groups. For this purpose, the polyisonitriles are admixed with the synthetic plastics, such as acrylic acid polymers, maleic acid semi-ester and semi-amide polymers and itaconic acid semi-ester and semi-amide polymers, in quantities between about 0.2 and 10% and the mixture is heated to temperatures between 30 and 100°. The quantity of the polyisonitriles to be added depends firstly on the carboxyl number of the plastics and secondly on the required degree of cross-linking. The polyisonitriles react with the carboxyl groups with formation of carboxylic acid amide derivatives.

Particularly valuable properties for the use in synthesis reactions are provided by aromatic polyisonitriles in which the o-positions of the isonitrile groups are occupied by halogen, alkyl, cyanogen or ester groups or in which an isonitrile group is disposed in juxtaposition to an orthofusion position of a polycyclic aromatic system. These polyisonitriles have a somewhat hindered reactivity, which can be changed by the choice of o-substituents.

EXAMPLE 1

CN—⟨ ⟩—S—⟨ ⟩—NC 2000 parts by weight of phosgene are introduced into a suspension of 272 parts by weight of 4,4'-diformyl-amino-diphenyl-thioether (obtainable from 4,4'-diamino-diphenyl-thioether and boiling formic acid,) 500 parts by weight of triethylamine, 1200 parts by weight of methylenechloride and 800 parts by weight of water are added. The organic phase is separated and concentrated in vacuo. Yield: 179 parts by weight of 4,4'-diisocyano-thiodiphenylether; decomposition from 105° C.

What is claimed is:
1. 4,4'-diisocyano-thio-diphenylether.

References Cited

Hieber et al.: Chemical Abstracts, vol. 50, p. 13807 (1956).

JOSEPH REBOLD, Primary Examiner

D. H. TORRENCE, Assistant Examiner

U.S. Cl. X.R.

260—78 SC, 78.5 T, 88.1 PC, 389, 463, 464, 465 D, 465 F, 465 G, 465.8 R, 562 A, 562 P, 562 R, 940, 999, 944